United States Patent
Cochrane et al.

(10) Patent No.: US 6,496,828 B1
(45) Date of Patent: Dec. 17, 2002

(54) SUPPORT FOR SUMMARY TABLES IN A HETEROGENEOUS DATABASE ENVIRONMENT

(75) Inventors: Roberta Jo Cochrane, Los Gatos, CA (US); James C. Kleewein, San Jose, CA (US); Ting Yu Leung, San Jose, CA (US); Mir Hamid Pirahesh, San Jose, CA (US); Narayana Subramanian, San Jose, CA (US); Shivakumar Venkataraman, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/466,862

(22) Filed: Dec. 17, 1999

(51) Int. Cl.$^7$ .............................................. G06R 17/30
(52) U.S. Cl. ............................................ 707/10; 707/3
(58) Field of Search ................................ 707/2, 3, 4, 5, 707/100, 201, 10

(56) References Cited

U.S. PATENT DOCUMENTS

| | | | | |
|---|---|---|---|---|
| 5,276,870 | A | 1/1994 | Shan et al. | 707/3 |
| 5,535,385 | A | 7/1996 | Griffin et al. | 707/3 |
| 5,544,355 | A | 8/1996 | Chaudhuri et al. | 707/3 |
| 5,546,570 | A | 8/1996 | McPherson, Jr. et al. | 707/3 |
| 5,588,150 | A | 12/1996 | Lin et al. | 707/1 |
| 5,590,321 | A | 12/1996 | Lin et al. | 707/10 |
| 5,600,831 | A | 2/1997 | Levy et al. | 707/2 |
| 5,671,403 | A | 9/1997 | Shekita et al. | 707/3 |
| 5,671,404 | A | 9/1997 | Lizèe et al. | 707/5 |
| 5,706,499 | A | 1/1998 | Kleewein et al. | 707/10 |
| 5,768,577 | A | 6/1998 | Kleewein et al. | 707/10 |
| 5,768,578 | A | 6/1998 | Kirk et al. | 707/11 |
| 6,169,983 | B1 * | 1/2001 | Chaudhuri et al. | 707/2 |
| 6,223,171 | B1 * | 4/2001 | Chaudhuri et al. | 707/2 |
| 6,356,890 | B1 * | 3/2002 | Agrawal et al. | 707/2 |

FOREIGN PATENT DOCUMENTS

WO    WO 98/092384    3/1998    ............ G06F/17/30

OTHER PUBLICATIONS

IBM Technical Disclosure Bulletin vol. 22 No. 4 Sep. 1979, Access Path Selection in a Relational Database Management System, 1657–1660.

IBM Technical Disclosure Bulletin vol. 35 No. 1A Jun. 1992, Deriving Production Rules for Incremental View Maintenance, 178.

Wookey Lee, Jooseok Park, Sukho Kang, A Distributed Differential Join Data Replicator, Journal of Computer Information Systems vol. XXXVIII No.6 Summer 1998, 108–116.

(List continued on next page.)

*Primary Examiner*—Diane D. Mizrahi
(74) *Attorney, Agent, or Firm*—Kunzler & Associates

(57) ABSTRACT

A system, method, and article of manufacture for supporting summary tables in a distributed database environment is disclosed. The system generally comprises a central program and a plurality of remote database systems that may be heterogeneous. The central program is configured to communicate with the database systems and to support summary tables (also referred to as materialized views) within the central program or within one or more of the database systems. The summary tables may contain summary data from one or more of the database systems. The central program may initiate the generation of summary tables, which may be populated local to the central program or local to one or more of the database systems. The central program may also maintain or coordinate maintenance of the summary tables. In addition, the central program may be configured to receive user queries on one or more of the database systems and to generate optimized query plans based upon the user queries, considering in so doing, the summary tables.

40 Claims, 6 Drawing Sheets

OTHER PUBLICATIONS

Surajit Chaudhuri, Ravi Krishnamurthy, Spyros Potamianos, Kyuseok Shim, Optimizing Queries with Materialized Views, 190–199.

Ashish Gupta, Venky Harinarayan, Dallan, Quall, Aggregate–Query Processing in Data Warehousing Environments, Proceeding of the 21$^{st}$ VLDB Conference Zurich, Swizerland, 1995.

Subbu N. Subramanian, Shivakumar Venkataraman, Query Optimization Using Restructing–Views, Paper # AMERICA 181, 1–25.

Alon Y. Levy, Alberto O. Mendelzon, Yehoshua Sagiv, Divesh Srivastava, Answering Queries Using Views, 95–104.

Divesh Srivastava, Shaul Dar, H.V. Jagadish, Alon Y. Levy, Answering Queries with Aggregation Using Views, Proceedings of the 22$^{nd}$ VLDB Conference Mumbai(Bombay), India, 1996.

Laks V.S. Lakshmanan, Fereidoon Sadri, Iyer N. Subramanian, SchemasSQL–A Language for Interoperability in Relational Multi–Database Systems, Proceedings of the 22$^{nd}$ VLDB Conference Mumbai(Bombay), India, 1996, 1–12.

Laura M. Haas, Donald Kossmann, Edward L. Wimmers, Jun Yang, Optimizing Queries across Diverse Data Sources, AR_228, 1–25.

Renèe J. Miller, Using Schematically Heterogeneous Structures.

Marc Gyssens Laks V.S. Lakshmanan, Subbu N. Subramanian, Tables As a Paradigm for Querying and Restructuring, Proceedings of the ACM Symposium on Principles of Database Systems, Motreal, Quebec, Jun. 1996.

Ashish Gupta, Inderpal Singh Mumick, Maintenance of Materialized Views: Problems, Techniques, and Applications, 1–16.

Heterogeneous Database Query Optimization in DB2 Universal DataJoiner, Proceedings of the 24$^{th}$ VLDB Conference New York, USA, 1998.

Serge Abiteboul, Querying Semi–Structured Data.

* cited by examiner

SUPPORT FOR SUMMARY TABLES IN A HETEROGENEOUS DATABASE ENVIRONMENT

BACKGROUND OF THE INVENTION

1. The Field of the Invention

The present invention relates to database systems and more specifically, to manners of utilizing summary tables in a distributed database environment.

2. The Relevant Technology

A summary table, otherwise known as a materialized view, is a pre-computed and stored result of a query. A standard view is a derived relation defined in terms of base relations. A view defines a function mapped from a set of base tables to a derived table. This function is typically recomputed every time the view is referenced. A view becomes a materialized view when the tuples generated by the view are stored in a database. Index structures can be built on the materialized view. Consequently, database accesses to the materialized view can be much faster than recomputing the view. A materialized view or summary table is thus like a cache, essentially embodying a copy of selected data that can be accessed quickly.

The data stored in a database is generally accessed using a query formatted in the SQL language native to most existing database systems. It is a primary objective in designing database systems to be able to service queries with the least cost, that is, in the lowest amount of time. One manner of decreasing query response time is with the use of summary tables. It is often the case that certain data can be accessed more quickly by accessing one or more summary tables in which copies of the data have been stored. Summary tables are generally quite small relative to the entire database, and scanning a summary table is much more efficient than scanning multiple relations of a database. Thus, one technique for speeding up query servicing is to maintain a plurality of summary tables and to selectively direct queries to the appropriate summary table for which the query can be most rapidly serviced. It would be advantageous to employ summary tables directed to the various heterogeneous database systems in query optimization.

As a further complication to the employment of summary tables in multiple database systems (MDBS), some database systems do not support summary tables. In order to provide more efficient query servicing, it is desirable to utilize summary tables in such an environment.

Additionally, it is considered by the inventors to be advantageous in some instances to be able to support the summary tables locally within the respective databases of an MDBS, rather than within a centralized database management program. The benefits of so doing include better performance for a class of queries that involve computation on large amounts of data but that yields relatively smaller result sets; the possibility for using the remote source's replication utilities for maintaining the currency of the summary table; and the enablement of the remote database's applications to take advantage of the summary table.

It would be further advantageous if a single central program could be employed to support and manage summary tables on a plurality of heterogeneous database systems, including where necessary, on databases that do not natively support summary tables.

Accordingly, a need exists for a distributed database system that capitalizes on the use of summary tables. To best utilize such a system, the capability should be provided to centrally generate, maintain, and query the summary tables. The system preferably makes provisions for communicating with database systems that do not support summary tables. Such a distributed database system and its method of use are disclosed herein.

OBJECTS AND BRIEF SUMMARY OF THE INVENTION

The apparatus of the present invention has been developed in response to the present state of the art, and in particular, in response to the problems and needs in the art that have not yet been fully solved by currently available database management systems. Thus, it is an overall objective of the present invention to provide a distributed database apparatus, system, and article of manufacture that capitalizes on summary tables within a plurality of heterogeneous database tables.

To achieve the foregoing object, and in accordance with the invention as embodied and broadly described herein in the preferred embodiment, a distributed database system and method are provided. The distributed database system is preferably implemented with modules for execution by a processor. In one embodiment, the modules comprise a central program comprising a communication module configured to communicate with a plurality of databases and an identification module configured to identify as a summary table a relation containing therein summary data from the plurality of databases.

At least one of the databases may be remote to the central program, and the databases may be heterogeneous. Each database may comprise a database system having database storage and a database manager. In one embodiment, at least one of the database systems does not directly support summary tables.

In one embodiment, the identification module comprises a single catalog resident in the central program. A nickname corresponding to the relation containing therein summary data from one or more of the plurality of heterogeneous database systems may be stored in the catalog. A description of the relation containing therein summary data as a summary table may also be stored in the catalog in conjunction with the nickname.

The central program may also comprise a summary table creation module within the central program, the summary table creation module configured to initiate the generation of a relation containing therein summary data from one or more of the plurality of databases.

The summary table may be created within the central program or, alternatively, remotely within the database system. In embodiments where the database system does not support summary tables, the database system is unaware that a relation containing therein summary data is a summary table.

The central program preferably comprises a query processing module configured to receive a user query and process the query for submission to one or more of the database systems. In one embodiment, the query processing module, generates an optimized query plan, considering in so doing, a cost model and the contents of one or more summary tables within one or more of the database systems.

An attendant method of use of the distributed database system in one embodiment comprises communicating with a plurality of databases from a central location and identifying as a summary table a relation containing therein summary data from the plurality of heterogeneous database systems. The step of communicating with a plurality of databases from a central location may comprise communicating with at least one database remote to the central program.

In one embodiment, the step of identifying as a summary table a relation containing therein summary data from the plurality of databases further comprises placing information indicative of the relation containing therein summary data within a single catalog resident in the central program.

The step of placing information indicative of the relation containing therein summary data within a single catalog resident in the central program may comprise placing a nickname corresponding to the relation containing therein summary data from one or more of the plurality of databases in the catalog. Additionally, placing information indicative of the relation containing therein summary data within a single catalog resident in the central program may comprise placing a description of the relation containing therein summary data as a summary table in the catalog and linking the description with the nickname.

The step of communicating with a plurality of databases from a central location may comprise communicating with a plurality of database management systems, one of the database management systems local to each of the heterogeneous database systems, at least one of the database management systems not directly supporting summary tables.

The method may further comprise communicating with a plurality of database systems, in which at least one of the database management systems does not directly support summary tables. This may comprise creating a relation containing therein summary data within the database management system without informing the database management system that the relation containing therein summary data is a summary table.

The method may further comprise initiating the generation of a relation containing therein summary data from one or more of the plurality of heterogeneous database systems. The relation may be generated within the central program or within the one or more of the plurality of heterogeneous database systems.

The method may further comprise receiving a user query and in response, considering the usage of one or more summary tables within one or more of the heterogeneous database systems in generating an optimized query plan based upon the user query.

In yet another aspect of the invention, an article of manufacture comprises a program storage medium readable by a processor and embodying one or more instructions executable by the processor to perform the above-described method of use of a distributed database system.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 12, is not intended to limit the scope of the invention, as claimed, but is merely representative of presently preferred embodiments of the invention.

FIGS. 1 through 12 are schematic block diagrams and flow chart diagrams that illustrate in more detail the preferred embodiments of the present invention. The schematic block diagrams illustrate certain embodiments of modules for performing various functions of the present invention. In general, the represented modules include therein executable and operational data for operation within a computer system of FIG. 1 in accordance with the present invention.

As used herein, the term executable data, or merely an "executable," is intended to include any type of computer instructions and computer executable code that may be located within a memory device and/or transmitted as electronic signals over a system bus or network. An identified module of executable code may, for instance, be organized as an object, procedure, or function. Nevertheless, the executables of an identified module need not be located together, but may comprise disparate instructions stored in different locations which together comprise the module and achieve the purpose stated for the module. Indeed, an executable could be a single instruction, or many instructions, and may even be distributed over several different code segments, among different programs, and across several memory devices.

Similarly, operational data may be identified and illustrated herein within modules, and may be embodied in any suitable form and organized within any suitable type of data structure. The operational data may be collected as a single data set, or may be distributed over different locations including over different storage devices, and may at least partially exist merely as electronic signals on a system bus or network.

Figure 1:
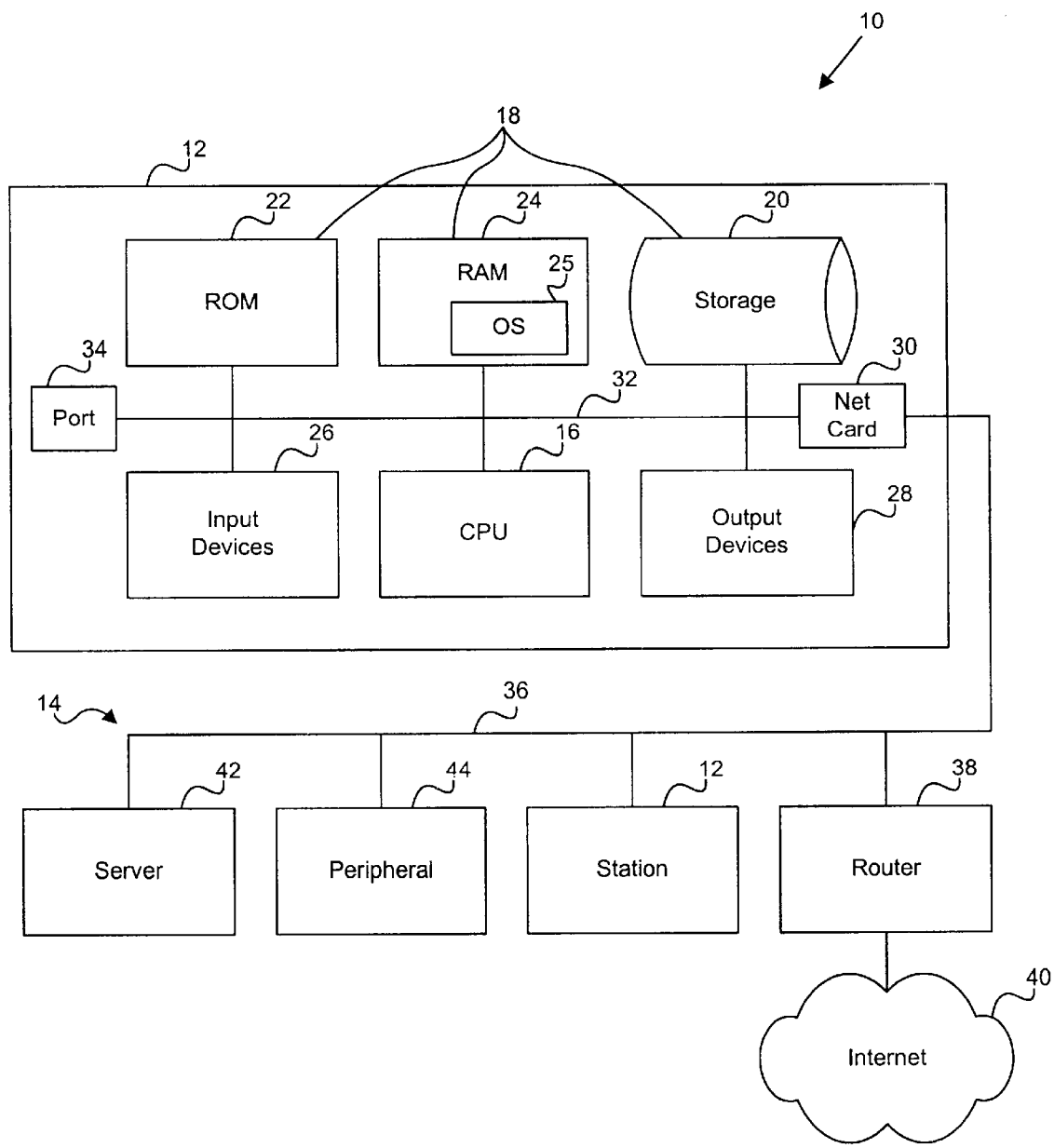
FIG. 1 is a schematic block diagram illustrating one embodiment of a computer system for use with the present invention.

FIG. 1 is a schematic block diagram that illustrates a computer system 10 in which executable and operational data, operating in accordance with the present invention, may be hosted on one or more computer stations 12 in a network 14. The network 14 may comprise a wide area network (WAN) and may also comprise an interconnected system of networks, one particular example of which is the Internet and the World Wide Web supported on the Internet.

A typical computer station 12 may include a processor or CPU 16. The CPU 16 may be operably connected to one or more memory devices 18. The memory devices 18 are depicted as including a non-volatile storage device 20 such as a hard disk drive or CD ROM drive, a read-only memory (ROM) 22, and a random access volatile memory (RAM) 24.

The computer station 12 or system 10 in general may also include one or more input devices 26 for receiving inputs form a user or form another device. Similarly, one or more output devices 28 may be provided within or be accessible from the computer system 10. A network port such as a network interface card 30 may be provided for connecting to outside devices through the network 14. In the case where the network 14 is remote from the computer station, the network interface card 30 may comprise a modem, and may connect to the network 14 through a local access line such as a telephone line.

Within any given station 12, a system bus 32 may operably interconnect the CPU 16, the memory devices 18, the input devices 26, the output devices 28 the network card 30, and one or more additional ports 34. The system bus 32 and a network backbone 36 may be thought of as data carriers. As such, the system bus 32 and the network backbone 36 may be embodied in numerous configurations. For instance, wire, fiber optic line, wireless electromagnetic communications by visible light, infrared, and radio frequencies may be implemented as appropriate.

In general, the network 14 may comprise a single local network (LAN), a wide area network (WAN), several adjoining networks, an intranet, or as in the manner depicted, a system of interconnected networks such as the Internet 40. The individual stations 12 communicate with each other over the backbone 36 and/or over the Internet 40 with varying degrees and types of communications capabilities and logic capability. The individual stations 12 may include a mainframe computer on which the modules of the present invention may be hosted.

Different communication protocols, e.g., ISO/OSI, IPX, TCP/IP, may be used on the network, but in the case of the Internet, a single, layered communications protocol (TCP/IP) generally enables communications between the differing networks 14 and stations 12. Thus, a communication link may exist, in general, between any of the stations 12.

The stations 12 connected on the network 14 may comprise application servers 42, and/or other resources or peripherals 44, such as printers and scanners. Other networks may be in communication with the network 14 through a router 38 and/or over the Internet 40.

Figure 2:
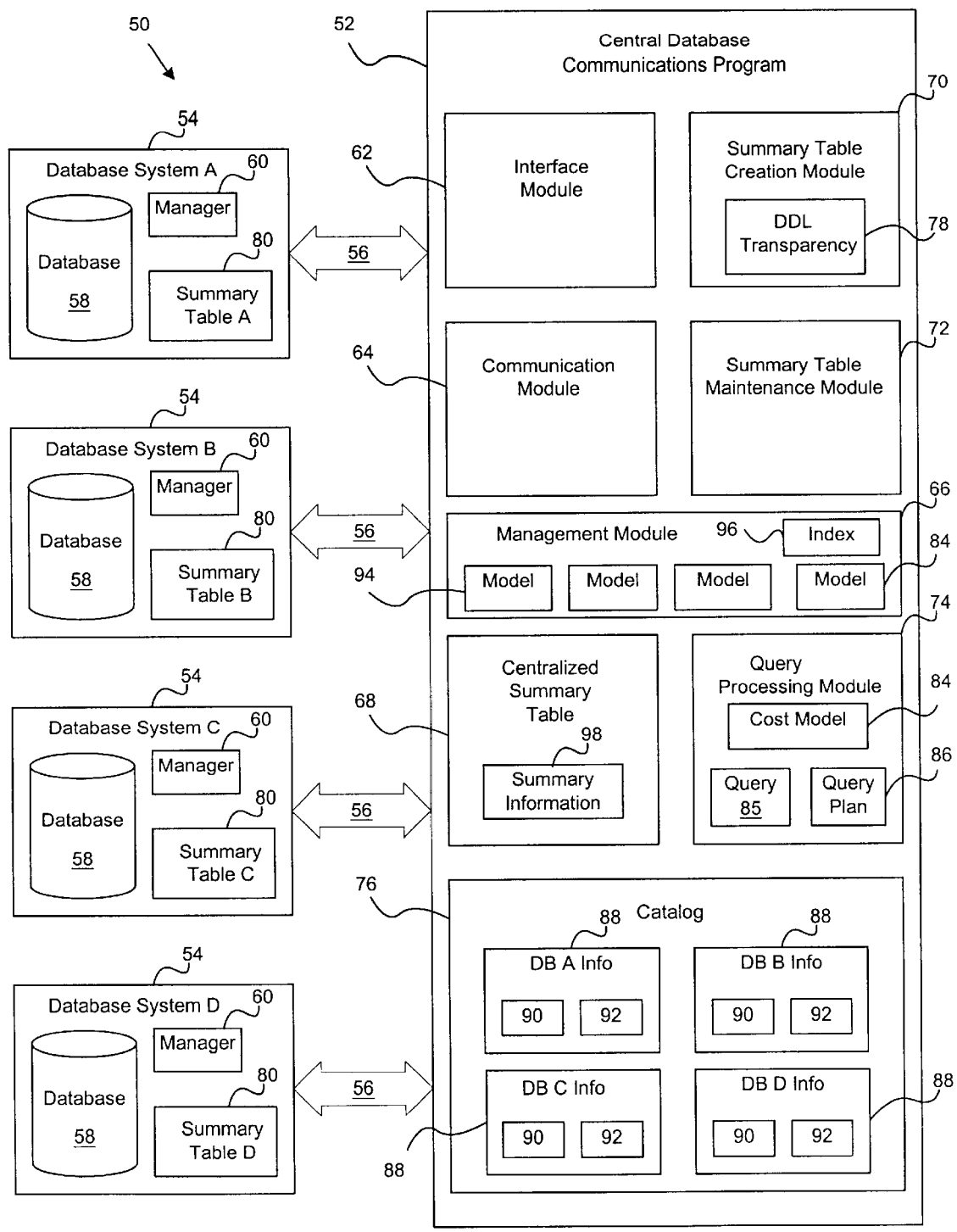
FIG. 2 is a schematic block diagram illustrating one embodiment of a distributed database system of the present invention.

Referring now to FIG. 2, the distributed database system 50 of the present invention, in one embodiment, includes a plurality of modules containing executable code and operational data suitable for execution by the CPU 16 and for operation within the memory devices 18 of FIG. 1. Of course, the memory devices 18 in which the modules of the present invention are located may also be distributed across both local and remote computer stations 12.

The distributed database system 50 is shown in FIG. 2 comprising a central database communications program (central program) 52 operating in conjunction with a plurality of database systems 54. The database systems 54 may be local to the central program 52, existing on a common hard disk drive 20 within a common computer station 12. Alternatively, the database systems 54 may be remote to the central program 52 and communicate across a remote link 56. The remote link 56 may comprise a network 14 (of FIG. 1) which may be a LAN or a WAN. The remote link 56 may also comprise a more global communication network, such as the Internet 40.

Each of the database systems 54 is preferably provided with a data storage mechanism, such as a database 58. A database management module 60 is also preferably provided for conducting such tasks as user interface, maintenance, query response, and the like. Within the database systems 54 may also be provided a summary table 80, as will be discussed below. Examples of database systems 54 with which the central program 52 may communicate include Sybase™, Informix™, Oracle™, and SQL Server™, SQL Anywhere™, Terradata™, and IBM's DB2™ in its various forms and configurations.

The central program 52 is preferably a linking and communicating program that allows a user at a central location to communicate with a plurality of database systems, regardless of where the databases are located. Preferably, the central program 52 is also configured to allow a user to communicate with different types of database systems 54 in a federated environment, and to conduct operations upon the database systems 54. These operations may include, for example, generation or maintenance of tables within the database systems 54, maintenance, or communications such as querying the database systems 54. One example of a central program 52, given by way of example, is DataJoiner™, distributed by IBM Corporation of Rochester, N.Y.

In one embodiment, the database systems 54 are heterogeneous. That is, they are different types of database systems with different configurations and possibly from different manufacturers. For instance, one database system 54 might be an IBM DB2 database system, while another database system 54 might comprise a Sybase database system. In addition, the different database systems 54 may contain tables exhibiting heterogeneous formatting, or "schemas." That is, the information within tables of the database systems 54 maybe organized into different combinations of relations, rows, and columns, possibly with different relation names, row names, and column names.

In the depicted embodiment, the central program 52 comprises an interface module 62 for allowing a human user to interact with the central program 52, a communication module 64 for effecting communications with the database systems 54, and a management module 66.

The management module 66 is preferably configured to store information regarding the differing types of database systems 54 are communicating with the central program 52 and their locations. The management module may also store information relating to the specific database types 54 within models 94. Preferably, one model 94 is stored for each type of database system 54 that the central program 52 is allowed to communicate with. The models may also contain information regarding the different configurations that are possible for a particular type of database system 54. Among the information preferably stored in the models 94 or in the management module 66 generally is information regarding how the particular database system 54 handles summary tables.

Thus, for instance, a separate model 94 may be provided for the Sybase database, a model 94 may be provided for the SQL Server database, a model 94 may be provided for the Oracle database, a model 94 may be provided for the DB2 database, etc. The management module 66 also preferably includes an index 96 of the different database systems 54 communicating with the central program 52. Thus, various modules of the central program 52 preferably consult the management module 66 when dealing with a particular database system 54 in order to determine how to properly communicate with the database system 54. One example, of dealings with the database systems, as will be discussed, is the particular manner of establishing summary tables 80 within the database systems 54 and/or summarizing data of the database systems 54, maintaining the summary tables 80, and querying the summary tables 80.

The central program 52 may also comprise a centralized summary table 68 in lieu of, or as a supplement to, summary tables 80 located remotely within the database systems 54. In one embodiment, the central program 52 comprises IBM's DataJoiner™ program, which is combined into an IBM DB2™ database system, and the summary table 68 is located within the DB2™ database 58. In this instance, the IBM DB2™ database system is considered to be local to the central program 52 (DataJoiner™).

Any one of the summary tables 68, 80 may comprise summary information 98 summarizing data on one or more of the databases 58 of the database systems 54. In fact, one advantage of the present invention is that a Summary Table A 80 within a database system A 54 may, for instance, summarize data located within Database System A as well as summarizing information located within Database System B and/or others of the database systems 54. Likewise, the centralized summary table 68 may contain summary data 98 summarizing the contents of one or more of the databases 58.

Also included in the central program 52 may be a summary table creation module 70, a summary table maintenance module 72, a query processing module 74, and a catalog 76. In one embodiment, the summary table creation module is configured to initiate the generation of a summary table 80, 68. The summary table generation may be initiated at a user's request or in accordance with the answering of a query 85.

The initiation of the summary table generation may be conducted in any manner, but is conducted in one embodiment using a DDL transparency feature. DDL transparency takes advantage of DDL commands inherent to the SQL language. That is, SQL DDL commands 78 are used to generate a table within a given database 54. The summary table 68, 80 is generated containing summary data 98 and is effectively a summary table, though the database system 54 need not recognize the table (or relation) 68, 80 as a summary table, and indeed, the database system 54 may not even support the generation of summary tables 80, 68. In such a case, the summary table is referred to herein as an "unrecognized summary table." Where the summary table 68 is generated within the central program 52, the database system(s) that it summarizes need not even know of the existence of the summary table 68.

The summary table creation module 70, when initiating the generation of a summary table 80, 68 preferably instructs the generating entity, whether the central program 52 or a database manager 60, to assign the summary table 68, 80 an alias or "nickname" 90. The nickname 90 is preferably transmitted to the catalog 76 and stored there with other information 88 regarding the contents of the database 58. This information 88 preferably includes lists of tables within each database 58, the nature of the data stored in the tables, and the particular schema used in each table.

A description 92 of each summary table 68, 80, its schema, and its contents, is also preferably generated and stored within the catalog 76, preferably together with the information 88 of the database or databases 58 which the summary table 68, 80 summarizes. Thus, the catalog 76 and information stored therein serve as one manner of identifying the summary tables 68, 80 as constituting summary tables and as such may be referred to herein as an identification module. Of course, other types of identification modules for identifying the summary data may be utilized, including identification of the summary tables 68, 80 within indexes such as the index 96.

The summary table maintenance module 72 preferably maintains or coordinates the maintenance of the summary tables 68, 80. That is, the summary table maintenance module 72 preferably instructs the database systems 54 to maintain the summary tables 68, 80 in a selected manner. The particular manner may be automatic and preselected, or may be selected on a case by case basis by the user. The particular manners of maintaining the summary tables 68, 80 include immediate, SQL-synchronous maintenance in which maintenance is triggered by any modifications to the tables within the scope of the view definition and incremental, non-SQL-synchronous maintenance in which a data propagator or replication tool periodically computes updates to be done on the summary table and maintains these updates on a periodic basis. One example of a replication tool is DPROP-R™ from IBM. A further type of maintenance is deferred maintenance in which a user initiates a full refresh of the summary table and populates it when desired by the user.

The query processing module 74 is shown including a cost model 84, a query 85, and a query plan 86. In one basic embodiment, the query processing module 74 is configured to receive a query 85 from a user through the interface module 62 and transmit the query 85 to the relevant database systems 54 to answer the query 85.

In a more preferred embodiment, the query processing module 74 also optimizes the query 85 into an optimized query plan 86. In so doing, the query processing module 74 preferably consults a cost model 84. The query processing module 74 also preferably considers the particular summary tables 68, 80 that may exist either locally on the central program 52 and/or remotely on the database systems 54.

The query processing module may be configured to generate an optimized query plan 86 that directly references one or more summary tables 68, 80 in answering the query 85. It may also be configured to provide instructions to the database systems 54 without referring to the summary tables 80, such that the database systems 54 are allowed to decide locally whether or not to reference the summary tables 80. One example of a manner of configuring a query processing module is described in our copending and pending patent application Ser. No. 09/412,034 filed on Oct. 4, 1999 for Query Optimization System and Method, which is hereby incorporated by reference into this document.

The catalog 76 preferably contains information 88 regarding each of the communicating database systems 54. As mentioned, together with that information 88 is preferably stored information regarding each summary table 68, 80 the nickname 90 of each summary table 80 together with a description of the schema and contents of the summary tables 80.

Figure 3:
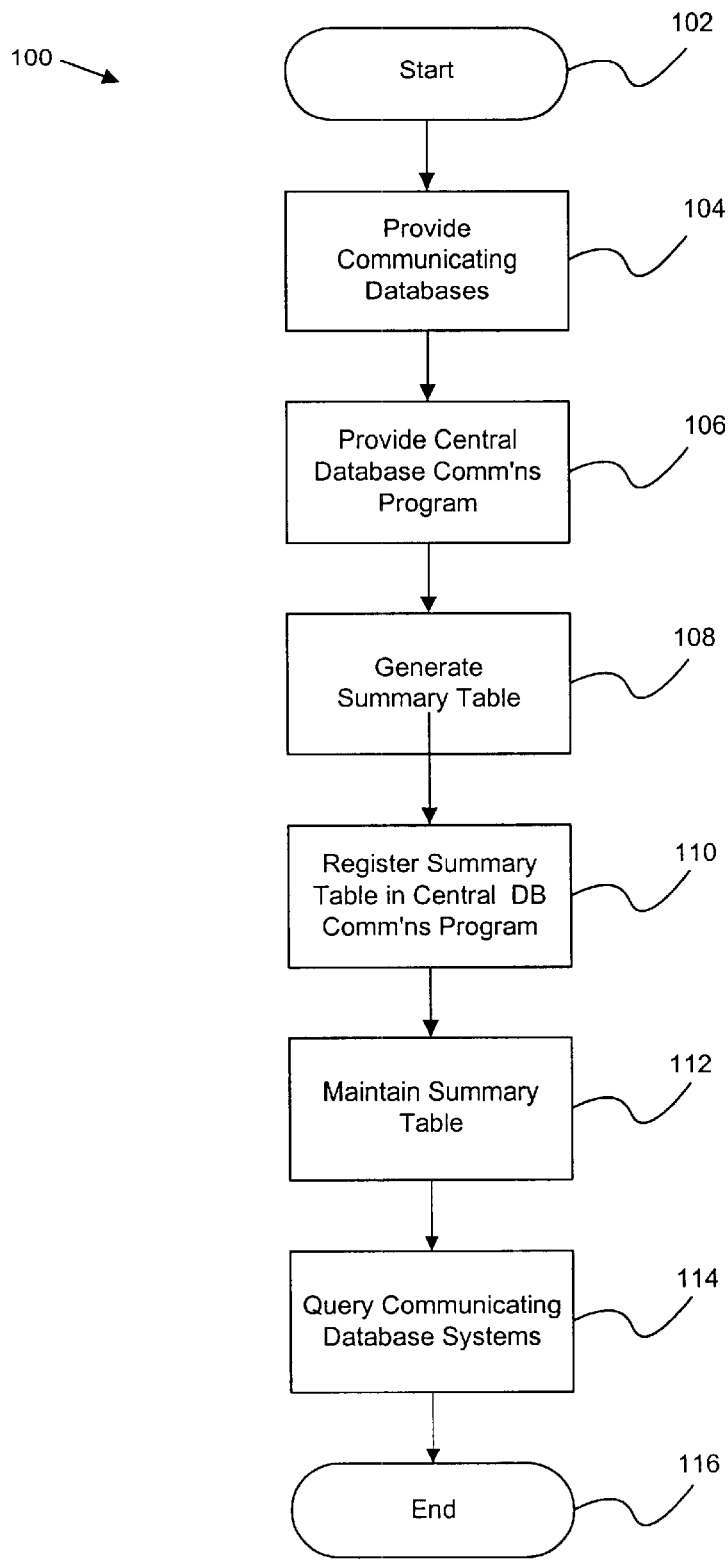
FIG. 3 is a schematic flow chart illustrating on embodiment of a method of supporting summary tables in a distributed database system of the present invention.

FIG. 3 is a schematic flow chart diagram illustrating one embodiment of a general method 100 of use of the distributed database system 50 of FIG. 2. As depicted, the method 100 starts at a step 102 and progresses to a step 104. In the step 104, the database systems 54 are preferably provided. Preferably, the database systems 54 are configured in the manner described above. In one embodiment, the database systems 54 are heterogeneous. That is, the database systems 54 are of different types and/or configurations, as discussed above.

In a step 106, a central database communications program (central program) 52 is provided. Preferably, the central program 52 is configured in the manner described above.

In a step 108, one or more summary tables 68, 80 are generated. The summary tables 68, 80 may be created local to the central program 52 or may be created remotely on one or more of the database systems 54. Preferably, the summary tables 68, 80 comprise information that constitutes a summary of data of or more of the databases 58. Thus, the summary tables 68, 80 are useful in many instances in reducing query cost and are thus preferably considered by the query processing module 74 in generating an optimized query plan 86. A method 130 of FIG. 4 describes in greater detail one manner of generating a summary table 68, 80.

In a step 110, information pertaining to one or more of the summary tables 68, 80 generated at step 108 is registered in the central program 110. A method 150 of FIG. 5 describes in greater detail one manner of registering a summary table 68, 80 in the central program 110.

In a step 112, the summary table(s) 68, 80 generated in step 108 are maintained. The manners of maintaining the summary tables are selected, either by a user or automatically by the central program 52 and are preferably selected from among the three manners described above.

In a step 114, a query 85 is generated by a user. Preferably, the query 85 is directed to information stored on one or more of the database systems 54. The query is preferably submitted first to the central program. The central program 52 may submit the query 85 directly to the one or more database systems 54 to which it is directed, or may optimize or otherwise process the query. Preferably, a response such as a query plan 86 is generated and submitted to the database systems 54. In one embodiment, in generating a response to the query 85, one or more summary tables 68, 80 is considered. One method 170 for responding to the query using summary tables 68, 80 is illustrated below with respect to FIG. 6. At a step 116, the method 100 ends.

Figure 4:
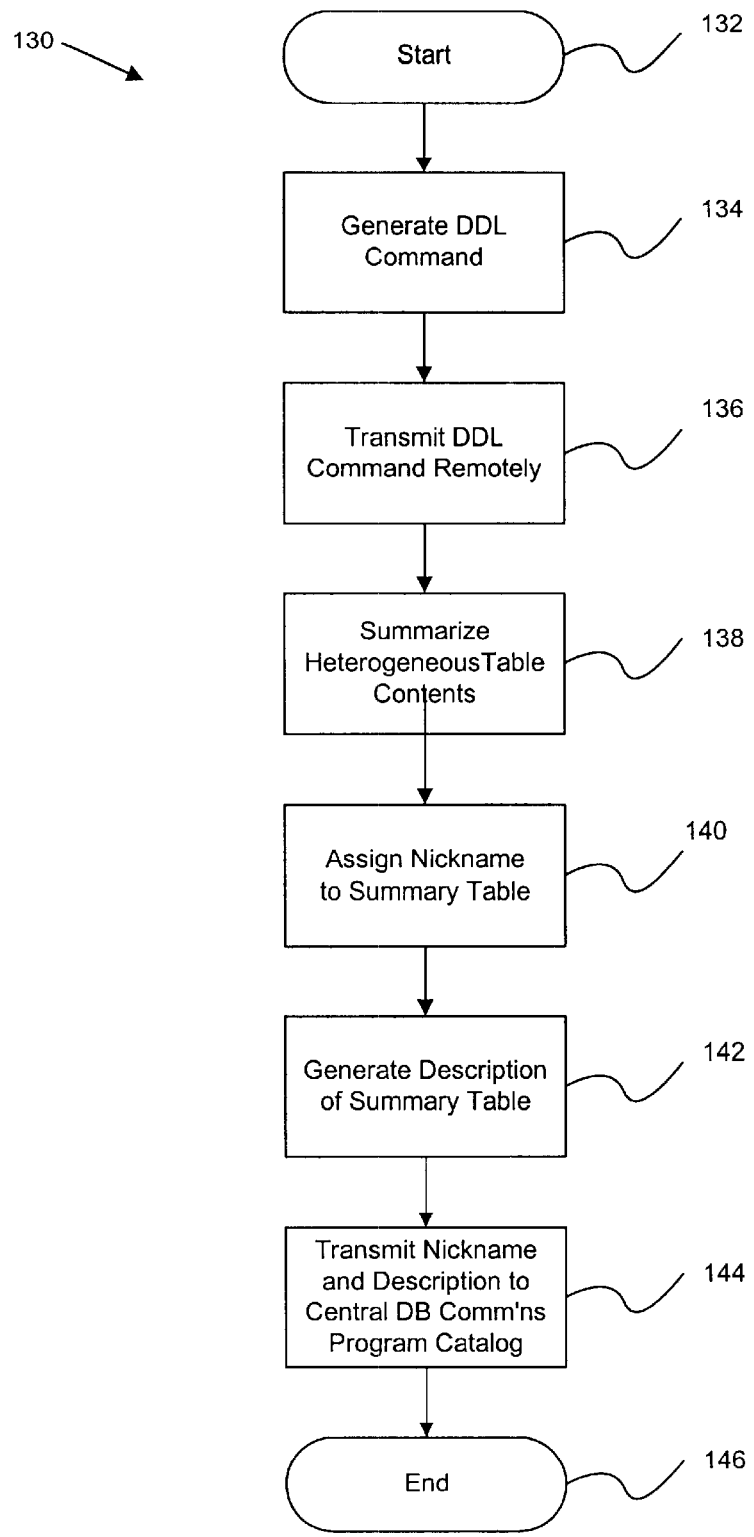
FIG. 4 is a schematic flow chart diagram illustrating in greater detail one manner of conducting a generate summary table operation of FIG. 3.

FIG. 4 illustrates one method 130 of generating a summary table. Thus, the method 130 may be considered to be one manner of conducting the step 108 of FIG. 3. The method 130 starts at a step 132 and progresses to a step 134 where a DDL command is generated. The DDL command may be generated by a user using standard SQL syntax. Alternatively, the DDL command may be generated in response to a user command which requests the generation of a summary table. One example of a DDL command is given in Example 1.0.

A distributed database system consisting of three tables on a Sybase database system 54 has the following Schema:

EMP (empno, ename, salary, dno)
DEPT (dno, dname, budget)
EMP_PERS (ename, dob, address, date-recruited)

These three tables are represented as nicknames EMP, DEPT, and EMP_PERS on the central program 52. One example of a DDL command 78 to generate a summary table 68, 80 on two of these tables is as follows:

CREATE SUMMARY TABLE RICHDEPT_EMP
(name, salary, dept) AS
(SELECT ename, salary, dname
FROM EMP, DEPT
WHERE budget >1,000,000
AND EMP.dno =DEPT.dno)
REFRESH DEFERRED
in SYBASE_TABLESPACE;

The DDL command identifies those employees that work in departments that have a budget that is greater than one million. The summary table is created locally on one of the Sybase database systems 54 and a nickname, RICHDEPT_EMP, corresponding to the summary table is created on the central program 52.

EXAMPLE 1.0

At a step 136, the DDL command 78 is transmitted to the database system 54 on which the command 78 is to be executed. In the case of Example 1.1, the DDL command is transmitted to the selected Sybase database system 54.

At a step 138, the DDL command 78 is executed, thereby summarizing the contents of the database(s) 58. Thus, in the case of Example 1.1, the tables EMP and DEPT, which correspond to databases 58 on separate database systems 54 are summarized according to the query parameters selected by the user. The table is then stored, either on the central program 52 or on one of the database systems 54, which as discussed, may be remote to the central program 52.

Of course, if the database system 54 does not support summary tables, the summary table may still be created directly on the database system 54. The DDL command is issued, but while summarizing contents of the database system 54 (and/or other database systems 54) the DDL command merely creates a normal table which is recognized by the database system 54 as a normal table, but which is recognized by the central program 52 as a summary table.

At a step 140, a nickname 90 is assigned to the summary table 68, 80. In Example 1.1, the nickname is assigned with the transmission of the DDL command 78 and is accompanied by information regarding how to access the summary table 68, 80.

At a step 142, a description 92 of the summary table 68, 80 being created is generated. The description 92 is generated automatically by SQL. In one embodiment, the description comprises a flag that is turned on in the catalog 76 indicating a summary table. Additionally, the description 92 preferably comprises the view definition used in generating the summary table 68, 80. For instance, the DDL command preferably contains the view definition of the summary table and when the DDL command is applied to create the summary table, the central program 52 is configured to store that view definition in the catalog 76.

In one embodiment the central program comprises a standard database manager 60 or is in communication with a database manager 60. For instance, in the preferred embodiment where the central program 52 comprises DataJoiner®, DataJoiner is provided within or in conjunction with IBM's DB2®.

At a step 144, the nickname 90 and description 92 are transmitted to the catalog 76 of the central program 52 and stored therein. At a step 146, the method 130 ends.

Figure 5:
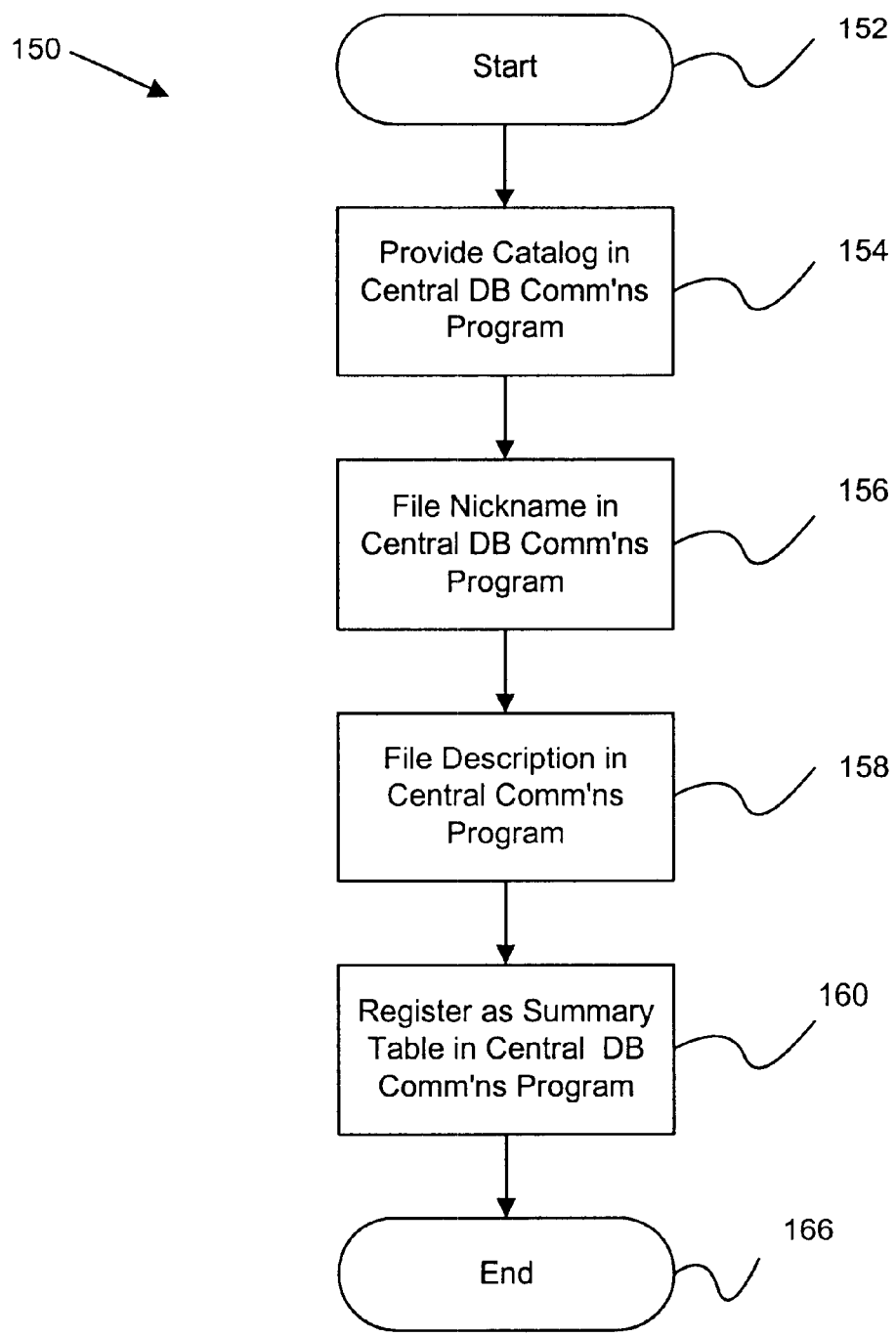
FIG. 5 is a schematic flow chart diagram illustrating in greater detail steps for conducting a register summary table operation of FIG. 3.

FIG. 5 illustrates one method 150 of registering a new summary table in the central program. Thus, the method 150 may considered to be one manner of conducting the step 110 of FIG. 3. The method 150 starts at a step 152 and progresses to a step 154 where a catalog 76 is provided within a central program 52. Preferably, the catalog 76 is formatted in the manner described above.

At a step 156, the nickname 90 is filed in an appropriate location in the central program 52. In one embodiment, the nickname 90 is filed together with other database information 88 in the catalog 76 of the central program 52.

At a step 158, a description such as the description 92 generated at step 142 of FIG. 4 is filed in an appropriate location in the central program 52. Once again, the description 92 is preferably filed together with other information 88 in the catalog 76 of the central program 52.

At a step 160, the new summary table 68, 80 is registered within the central program 52 as constituting a summary table. Thus, regardless of whether the local database system 54 recognizes the newly created summary table 68, 80 as containing summary data or not, it is treated by the central program as a summary table. At a step 162, the method 150 ends.

Figure 6:
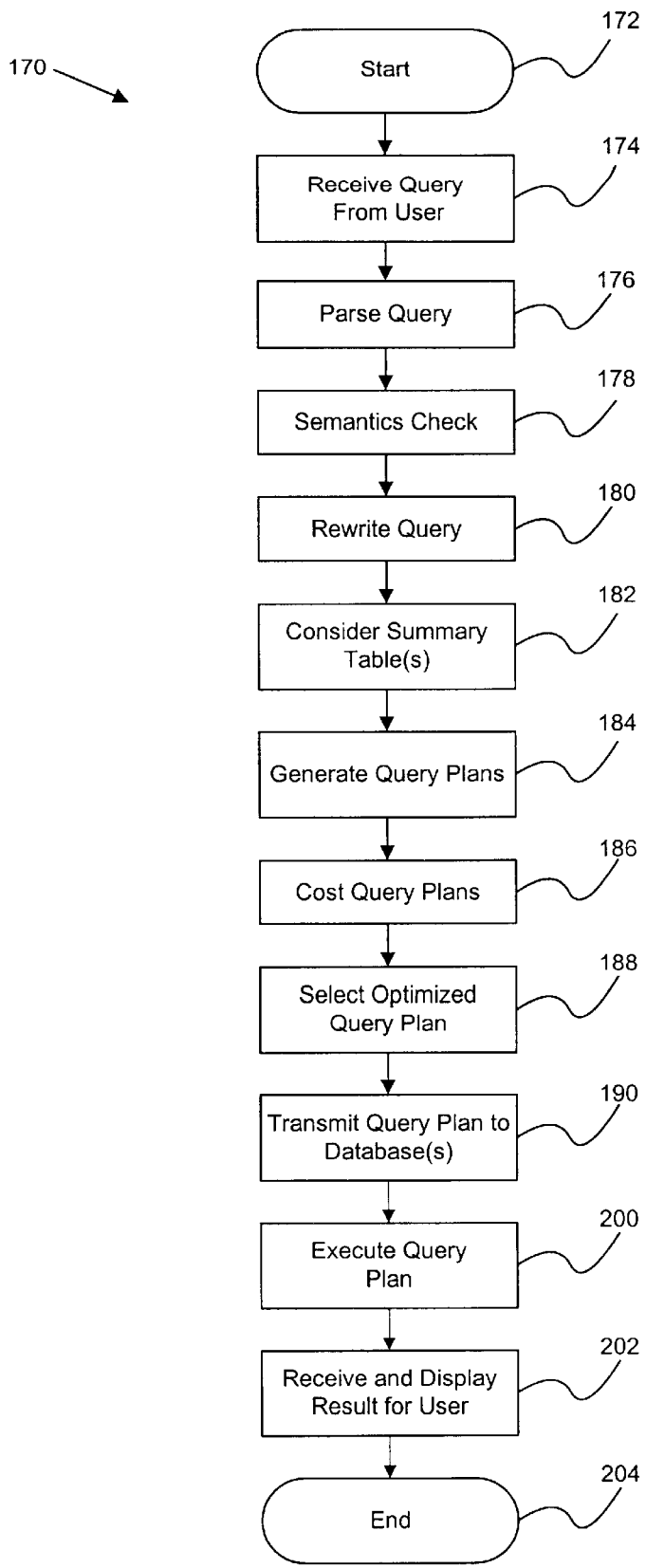
FIG. 6 is a schematic flow chart diagram illustrating in greater detail one manner of conducting a query of a summary table of FIG. 3.

FIG. 6 illustrates one method 170 of querying a communicating database system 54 using a summary table 68, 80. Thus, the method 170 may be considered to be one manner of conducting the step 114 of FIG. 3. The method 170 starts at a step 172 and progresses to a step 174 where a query 85 is received from a user. The query 85 is preferably an SQL query and may be received directly from a human user or from a separate program communicating with the central program 52. The query 85 is received into the central program 52, preferably into the query processing module 74.

At a step 176, the query processing module 74 parses the query 85 into initial data structures suitable for further operations. Such data structures in one embodiment include query graph models (QGM). A discussion of the use of query graph models can be found in Hamid Pirahesh, et. al., Extensible Rule Based Query Rewrite Optimization in Starburst, as published in the conference proceedings for SIGMOD 1992, pages 39–48, which is hereby incorporated by reference into this document.

At a step 178, semantics of the query 85 are checked for accuracy and completeness. For instance, checks may be made to see if the various types of data such as column names and relation names referenced by the query 85 are correct and whether referenced tables exist.

At a step 180, the query is rewritten into a more efficient form. In so doing, at a step 182, the query processing module 74 preferably considers the contents of the summary tables as referenced by the information 92 within the catalog 76. Preferably, this comprises consulting information 92 about all summary tables 68, 80 that may exist within the system 50 and determining whether referencing information within one or more of the summary tables 68, 80 in answering the query 85 would improve query response time.

At a step 184, a plurality of alternate query plans are preferably generated, each plan directed to answering the query in a different manner. At a step 186, the various query plans are costed according to the cost model 84. Preferably, the cost model 84 is provided with reference costs for the various operations that may be required to answer a query 85. At a step 188, the query optimized for the least cost is selected according to the projected costs from step 186. These steps are disclosed in greater detail in our co-pending and pending patent application Ser. No. 09/412,034, listed above.

In one embodiment, the optimized query plan 86 references the summary tables 68, 80 where so doing is the most efficient manner of answering the query 85. Where referencing the summary tables 68, 80 is not most efficient, the selected optimized query plan 86 does not reference the summary tables.

In a step 190, the queryplan 86 is transmitted to the databases 58 referenced therein. This generally comprises transmitting the optimized query plan 86 or relevant portions thereof across the link 56 to the referenced database systems 54. At a step 192, the managers 60 within the database systems 54 execute their respective portions of the query plan 86 to generate the desired results. The results are transmitted to the user either directly or through the central program and are displayed on a display device 28 for viewing by the user.

The optimized query plan 86 generated in the method 170 may directly reference summary tables 80 within the database systems 54. Alternatively, the query plan 86 may be directed to other tables of the databases 58 without referencing any of the summary tables 80. In these cases, the managers 60 in the target database systems consider locally whether or not to consult a summary table 80. In so doing, the query processing module 74 preferably still considers the summary tables 80, predicts whether the managers 60 will reference the summary tables in responding to the query plan 86, and uses this information in generating a least cost query plan 85.

In cases of database systems 54, such as current Sybase database systems, that are not equipped to create, recognize, or otherwise support summary tables, the summary table can be still be created. Thus, under the present invention, summary tables can be generated summarizing the databases 58 of the database systems, whether summary tables are supported on the database systems 54 or not.

Additionally, the generation of a summary table using DDL commands is transparent to the database system 54. Furthermore, assigning the summary table a nickname and storing the nickname and information regarding the contents and schema of the summary table within the central program 52 allows the central program 52 to maintain and query the summary tables within the non-summary table supporting databases systems. One example of querying a summary table within a database system 54 that does not support summary tables is given in Example 2.0.

A query is posed against the database systems defined in Example 1.0. Within those database systems is the summary table RICHDEPT_EMP generated in Example 1.0. A query posed against those databases may take the form of:

| | |
|---|---|
| SELECT | ename, salary, address |
| FROM EMP, DEPT, EMP_PERS | |
| WHERE | salary > 40000 |
| and | budget > 1,000,000 |
| and | EMP.dno = DEPT.dno |
| and | EMP.ename = EMP_PERS.ename |

If this query is sent directly to the database systems that do not support summary tables, the database systems will not be able to make use of the materialized view RICHDEPT_EMP to optimize the query execution. The central program 52 (preferably through the query processing module 74), on the other hand, understands how to optimize the query using summary tables and transforms the query, preferably within the query plan 86, to a form such as the following:

```
SELECT       ename, salary, address
FROM         RICHDEPT_EMP,EMP_PERS
WHERE        salary > 40000 and
             RICHDEPT_EMP.ename = EMP_PERS.ename
```

EXAMPLE 2.0

The transformed query 85 may then be incorporated within the query plan 86 or transmitted directly to the relevant database system(s). In this manner, the central program 52 is able to utilize summary tables summarizing communicating database systems 54, regardless of whether any particular remote database system 54 supports and optimizes queries using summary tables.

At a step 184, the results are returned to the central program 52 and displayed on a display device for a user. At a step 186, the method 170 ends.

Examples of varying arrangements in which summary tables may be created, maintained, and queried under the present invention are given in the following examples.

In one example, one or more centralized summary tables 68 are created locally on the central program 52. The summary tables 68 are initially populated locally.

Maintenance is local and may be either incremental or deferred or no maintenance may be conducted. Queries to the summary tables are locally rewritten and optimized based on the summary table. Examples of the use of such centralized summary tables 68 include one or more summary tables created in an IBM DB2® universal database (UDB) that refer to data residing in one or more tables from remote and/or local database systems 54.

A sample DDL command for creating a summary table under this example is as follows:

CREATE SUMMARY TABLE SUM1 AS
(SELECT SUM(L_EXTENDEDPRICE) AS
  REVENUE, P_BRAND,
  COUNT(*) AS COUNT
FROM ORACLE_LINEITEM, SYBASE_PART
WHERE P_PARTKEY=L_PARTKEY
GROUP BY P_BRAND)
DATA INITIALLY DEFERRED REFRESH
  DEFERRED;

This DDL command creates the summary table SUM1 on the central program 52 (in this case a DB2 UDB) with a query directed to two tables. One table is an Oracle table identified as ORACLE_LINEITEM. The other table is a Sybase table identified as SYBASE_PART. Thus, a central summary table 68 is created and populated with data from a plurality of heterogeneous database systems 54. The term "DATA INITIALLY DEFERRED" indicates that the population of the summary table is local and is initiated by user command. As further indicated, the refresh of the table is also deferred.

EXAMPLE 3.1

In a second example, one or more summary tables are generated as centralized summary tables 68 locally on the central program 52. The tables 68 are initially populated.

Maintenance is local and may be either incremental or deferred or no maintenance may be conducted. Queries are not routed from the central program to the summary tables 68. Thus, these summary tables 68 are primarily useful for replicating and storing information. Users may choose to route queries directly against the summary table without passing through the query processing module 74.

A sample DDL command for creating a summary table under this example is as follows:

CREATE SUMMARY TABLE SUM1 AS
(SELECT SUM(L_EXTENDEDPRICE) AS
  REVENUE, P_BRAND,
  COUNT(*) AS COUNT
FROM ORACLE_LINEITEM, SYBASE_PART
WHERE P_PARTKEY=L_PARTKEY
GROUP BY P_BRAND)
DATA INITIALLY DEFERRED REFRESH DEFERRED
  ROUTING NONE;

This DDL command is the same as for Example 3.1, with the exception that no queries are routed to the summary table 68.

EXAMPLE 3.2

In a third example, one or more summary tables are generated remotely on one or more of the database systems 54. The tables 80 are initially populated either locally from the central program 52 or remotely from the database systems 54.

Maintenance is conducted remotely by the hosting database system 54 and may be incremental or deferred or may not be conducted at all. Queries on the base tables are routed to the remote hosting database 52 which in turn routes the queries 85 to the summary table(s) 80. Alternatively, queries may not be routed to the summary tables 80 at all.

Examples of this arrangement include situations where the hosting database system 54 supports summary tables and the description of the summary table 80 is exposed to the user at the central program 52 without performing any query routing.

A sample DDL command for creating a summary table under this example is as follows:

CREATE NICKNAME ORA_SUM1 ON
  ORACLE.J15USER1.ORA_SUM1;
ALTER NICKNAME ORA_SUM1 SET SUMMARY
  AS
(SELECT SUM(L_EXTENDEDPRICE) AS
  REVENUE, P_BRAND,
  COUNT(*) AS COUNT
FROM ORACLE_LINEITEM, ORACLE_PART
WHERE P_PARTKEY=L_PARTKEY
GROUP BY P_BRAND) REFRESH NONE ROUTING
  NONE;

This DDL command creates an alias ORA_SUM1 for a pre-existing summary table 80 on a remote database system (such as an Oracle system) that is called ora_sum1. The nickname for the summary table 80 is altered with the summary table definition. However, the "REFRESH NONE" and "ROUTING NONE" statements indicate that the summary table is not maintained by the central program nor are queries routed to the summary table.

EXAMPLE 3.3

In a fourth example, one or more summary tables are generated remotely on one or more of the database systems 54. The tables 80 are initially populated either locally from the central program 52 or remotely from the database systems 54.

Maintenance is conducted remotely by the hosting database system 54 and may be incremental or deferred or may not be conducted at all. Queries on the base tables are received by the central program 52 which optimizes the queries 85 into a query plan 86 which directly references the summary table(s) 80 where so doing is most efficient.

Examples of this arrangement include situations where the hosting database system(s) 54 support summary tables 80. A nickname 90 of the summary table is provided to the central program 52 and points to the summary table 80. Queries 85 submitted to the central program 52 are routed to the remote summary table 80 by the central program 52.

A sample DDL command for creating a summary table under this example is as follows:

```
CREATE NICKNAME ORA_SUM1 ON
  ORACLE.J15USER1.ORA_SUM1;
ALTER NICKNAME ORA_SUM1 SET SUMMARY
  AS
(SELECT SUM(L_EXTENDEDPRICE) AS
  REVENUE, P_BRAND,
  COUNT(*) AS COUNT
FROM ORACLE_LINEITEM, ORACLE_PART
WHERE P_PARTKEY=L_PARTKEY
GROUP BY P_BRAND) REFRESH NONE;
```

This DDL command is the same as that for Example 3.3 above, except that the "ROUTING NONE" command does not appear and accordingly, the central program 52 is instructed to route queries 85 to the summary table 80 of the remote database system 54.

EXAMPLE 3.4

In a fifth example, one or more summary tables are generated remotely on one or more of the database systems 54. The tables 80 may be initially populated either locally from the central program 52 or remotely from the database systems 54.

Maintenance is conducted by the central program 52. Queries on the base tables are received by the central program 52 which optimizes the queries 85 into a query plan 86 which directly references the summary table(s) 80, where so doing is most efficient.

Examples of this arrangement include the situation where the hosting database system 54 does not support summary tables 80. The summary table 80 is generated from the central program 52, which also maintains the summary table 80 and routes queries 85 to the summary table 80.

A sample DDL command for creating a summary table under this example is as follows:

```
CREATE NICKNAME ORA_SUM1 ON
  ORACLE.J15USER1.ORA_SUM1;
ALTER NICKNAME ORA_SUM1 SET SUMMARY
  AS
(SELECT SUM(L_EXTENDEDPRICE) AS
  REVENUE, P_BRAND,
COUNT(*) AS COUNT
FROM ORACLE_LINEITEM, ORACLE_PART
WHERE P_PARTKEY=L_PARTKEY
GROUP BY P_BRAND) DATA INITIALLY
  DEFERRED REFRESH DEFERRED;
```

Once again, this DDL command is similar to that of Example 3.4, but in addition to routing queries to the summary table on the remote database system 54, the maintenance of the summary table 80 is also performed by the central program 52.

EXAMPLE 3.5

In a sixth example, one or more summary tables are generated remotely on one or more of the database systems 54. The tables 80 are initially populated from the database systems 54.

Maintenance is conducted by the central program 52. Queries on the databases 58 are received by the central program 52 which optimizes the queries 85 into a query plan 86. The optimization takes the summary tables into consideration but the query plan 86 directly references only the base tables and leaves routing of the query to the summary table 80 to the hosting database system 54.

Examples of this arrangement include the situation where join indexes are used to create the summary table 80 and the database system 54 does not allow access to the join indexes.

A sample DDL command for creating a summary table under this example is as follows:

```
CREATE NICKNAME ORA_SUM1 ON
  ORACLE.J15USER1.ORA_SUM1;
ALTER NICKNAME ORA_SUM1 SET SUMMARY
  AS
(SELECT L_EXTENDEDPRICE, P_BRAND
FROM ORACLE_LINEITEM, ORACLE_PART
WHERE P_PARTKEY=L_PARTKEY)
ROUTING NONE;
```

This is an example of a DDL command for a join index. The summary table is created within the remote database system 54 and is maintained by the remote database system 54. No routing is done by the central program 52, other than using this information for cost modeling purposes to choose a query plan.

EXAMPLE 3.6

In a seventh example, one or more summary tables are generated remotely on one or more of the database systems 54. The tables 80 are initially populated from the central program 52 or are not populated.

Maintenance is conducted by the central program 52 or no maintenance is done. Queries on the base tables are received by the central program 52, which optimizes the queries 85 into a query plan 86 which takes the summary tables into consideration and which directly references only the base tables and leaves routing of the query to the summary table 80 to the hosting database system 54. This type of summary table arrangement may be useful where the maintenance capability of the central program 52 is better than the maintenance capability of the hosting database system 54. One example is where IBM's Datajoiner is used in conjunction with an IBM DB2 390 Database system 54.

A sample DDL command for creating a summary table under this example is as follows:

```
CREATE NICKNAME DB2390_SUM1 ON
  ORACLE.J15USER1.ORA_SUM1;
ALTER NICKNAME DB2390_SUM1 SET SUMMARY
  AS
(SELECT SUM(L_EXTENDEDPRICE) AS
  REVENUE, P_BRAND,
  COUNT(*) AS COUNT
FROM DB2390_LINEITEM, DB2390_PART
WHERE P_PARTKEY=L_PARTKEY
GROUP BY P_BRAND) DATA INITIALLY
  DEFERRED REFRESH DEFERRED;
```

This DDL command generates and maintains a summary table of a DB2 390 database system 54, even though DB2 390 natively does not support summary tables.

EXAMPLE 3.7

In an eighth example, one or more summary tables are generated remotely on one or more of the database systems 54. The tables 80 are initially populated either from the central program 52 or from the database systems 54. Maintenance is conducted by the central program 52. Queries are not routed to the summary table(s) 80.

Examples of this arrangement include tables maintained by IBM's DPROP-R™ through IBM's DataJoiner™. Tables are replicated across databases and queries are not routed to the replicated tables. A sample DDL command for creating a summary table under this example is as follows:

```
CREATE NICKNAME ORA_SUM1 ON
    ORACLE.J15USER1.ORA_SUM1;
ALTER NICKNAME ORA_SUM1 SET SUMMARY
    AS
(SELECT SUM(L_EXTENDEDPRICE) AS
    REVENUE, P_BRAND,
    COUNT(*) AS COUNT
FROM ORACLE_LINEITEM, ORACLE_PART
WHERE P_PARTKEY=L_PARTKEY
GROUP BY P_BRAND)
DATA INITIALLY DEFERRED REFRESH DPROPR
    ROUTING NONE;
```

This DDL command will generate a summary table 80 that is maintained by IBM's DPROPR™.

EXAMPLE 3.8

From the above-discussion, it should be readily apparent that the distributed database system and method of the present invention provides the advantages of supporting summary tables in a distributed database system having a central program communicating with remote database systems. The remote database systems may include database systems that not otherwise support summary tables.

With the support of summary tables across the remote database systems, query servicing can be expedited in many instances. The database systems may be heterogeneous, and data from two or more of the database systems may be summarized on a single summary table. The summary tables may be stored centrally or remotely within the database systems, where querying and maintenance may be performed more efficiently. The distributed database system and method are also compatible with and take advantage of existing technology and may be implemented to be transparent to the user.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A system for supporting summary tables in a distributed database system, the apparatus comprising:
    a communication module configured to communicate with a plurality of database systems; and
    an identification module communicating with the communication module and configured to identify a database table containing summary data from at least one of the plurality of database systems as being a summary table.

2. The system of claim 1, wherein the plurality of database systems are heterogeneous.

3. The apparatus of claim 1, further comprising a central program, and wherein the communication module and the identification module are contained within the central program and at least one of the database systems is remote to the central program.

4. The apparatus of claim 3, wherein the database table is stored on the central program.

5. The apparatus of claim 1, wherein the summary table is located within one of the database systems that is remote to the central program.

6. The apparatus of claim 1, wherein the identification module comprises a single catalog resident in a central program.

7. The apparatus of claim 5, further comprising a nickname assigned to the database table, the nickname stored within the catalog together with an indicator that the database table is a summary table.

8. The apparatus of claim 1, further comprising a plurality of database management systems, one of the database management systems local to each of the database systems, at least one of the database management systems not directly supporting summary tables, and wherein the database management system not directly supporting summary tables is unaware that the database table is a summary table.

9. The apparatus of claim 1, further comprising a summary table maintenance module, the summary table maintenance module configured to maintain a summary table located within a remote database system.

10. The apparatus of claim 1, further comprising a summary table creation module within the central program, the summary table creation module configured to initiate the generation of a database table containing therein summary data from one or more of the plurality of database systems.

11. The apparatus of claim 10, wherein the summary table creation module is configured to initiate the generation of a database table containing therein summary data from one or more of the plurality of database systems and storage of the database table within the one or more of the plurality of database systems.

12. The apparatus of claim 1, wherein the central program further comprises a query processing module configured to receive a user query and in response generate an optimized query plan, considering the usage of a summary table summarizing data within the database systems in generating the optimized query plan.

13. The apparatus of claim 1, wherein the communication module is configured to communicate with a plurality of communicating database systems each having a different manner of supporting summary tables and further comprising a summary table management module configured to manage summary table usage on each of the communicating database systems, including accommodating the different manners of supporting summary tables.

14. A method for supporting a summary table in a distributed database system comprising a central program and one or more remote databases, the method comprising:
    communicating with a plurality of database systems from a central location; and
    identifying at the central location a database table containing therein summary data from at least one of the plurality of database systems as being a summary table.

15. The method of claim 14, wherein communicating with a plurality of database systems from a central location comprises communicating with a plurality of database systems that are heterogeneous and at least one of which is remote to the central location.

16. The method of claim 14, further comprising initiating the generation of a summary table summarizing the contents of at least two of the plurality of heterogeneous database systems.

17. The method of claim 14, wherein identifying a database table containing therein summary data from the plurality of heterogeneous database systems as a summary table further comprises referencing the database table within a catalog resident in the central program and identifying the database table as a summary table within the catalog.

18. The method of claim 17, wherein placing information indicative of the database table containing therein summary data within a single catalog resident in the central program further comprises placing a nickname corresponding to the database table containing therein summary data from one or more of the plurality of heterogeneous database systems in the catalog.

19. The method of claim 17, wherein placing information indicative of the database table containing therein summary data within a single catalog resident in the central program further comprises placing a description of the database table identifying the database table as a summary table in the catalog and linking the description with the nickname.

20. The method of claim 14, wherein communicating with a plurality of heterogeneous database systems from a central location comprises communicating with a plurality of database management systems, one of the database management systems local to each of the heterogeneous database systems, at least one of the database management systems not directly supporting summary tables.

21. The method of claim 20, comprises communicating with a plurality of database management systems, one of the database management systems local to each of the heterogeneous database systems, at least one of the database management systems not directly supporting summary tables comprises creating the database table within the database management system not directly supporting summary tables without informing the database management system not directly supporting summary tables that the database table is a summary table.

22. The method of claim 14, further comprising initiating the generation of a database table containing therein summary data from one or more of the plurality of heterogeneous database systems.

23. The method of claim 14, wherein initiating the generation of a database table containing therein summary data from one or more of the plurality of heterogeneous database systems comprises initiating the generation of the database table within the one or more of the plurality of heterogeneous database systems.

24. The method of claim 14, further comprising receiving a user query and in response, considering the contents of one or more summary tables within one or more of the heterogeneous database systems in generating an optimized query plan based upon the user query.

25. The method of claim 14, wherein communicating with a plurality of communicating database systems comprises communicating with database systems having differing manners of supporting summary tables therein, and further comprising managing summary table usage on each of the communicating database systems, including accommodating the differing manners of supporting summary tables.

26. The method of claim 14, wherein communicating with a remote database from a central location comprises communicating with a plurality of heterogeneous database systems from a central location, and wherein identifying a database table containing therein summary data from at least one of the plurality of heterogeneous database systems as being a summary table comprises recognizing as a summary table a database table within the remote database, the database table containing therein summary data corresponding to the remote database.

27. The method of claim 14, further comprising
generating an unrecognized summary table within one of the plurality of remote database systems; and
identifying the unrecognized summary table as a summary table.

28. An article of manufacture comprising a program storage medium readable by a processor and embodying one or more instructions executable by the processor to perform a method for supporting summary tables in a distributed database system, the method comprising:
communicating with a plurality of database systems from a central location; and
identifying at the central location a database table containing therein summary data from at least one of the plurality of database systems as being a summary table.

29. The article or manufacture of claim 28, wherein communicating with a plurality of database systems from a central location comprises communicating with a plurality of database systems that are heterogeneous and at least one of which is remote to the central location.

30. The article of manufacture of claim 29, wherein the method further comprises initiating the generation of a summary table summarizing the contents of at least two of the plurality of database systems.

31. The article of manufacture of claim 28, wherein identifying a database table containing therein summary data from the plurality of heterogeneous database systems as a summary table further comprises referencing the database table within a catalog resident in the central program and identifying the database table as a summary table within the catalog.

32. The article of manufacture of claim 31, wherein placing information indicative of the database table containing therein summary data within a single catalog resident in the central program further comprises placing a nickname corresponding to the database table containing therein summary data from one or more of the plurality of heterogeneous database systems in the catalog.

33. The article of manufacture of claim 31, wherein placing information indicative of the database table containing therein summary data within a single catalog resident in the central program further comprises placing a description of the database table identifying the database table as a summary table in the catalog and linking the description with the nickname.

34. The article of manufacture of claim 28, wherein communicating with a plurality of heterogeneous database systems from a central location comprises communicating with a plurality of database management systems, one of the database management systems local to each of the heterogeneous database systems, at least one of the database management systems not directly supporting summary tables.

35. The article of manufacture of claim 34, wherein communicating with a plurality of database management systems, comprises creating the database table within the database management system not directly supporting summary tables without informing the database management system not directly supporting summary tables that the database table is a summary table.

36. The article of manufacture of claim 28, wherein the method further comprises initiating the generation of a database table containing therein summary data from one or more of the plurality of heterogeneous database systems.

37. The article of manufacture of claim 28, wherein initiating the generation of a database table containing therein summary data from one or more of the plurality of heterogeneous database systems comprises initiating the generation of the database table within the one or more of the plurality of heterogeneous database systems.

38. The article of manufacture of claim 28, wherein the method further comprises receiving a user query and in response, considering the contents of one or more summary tables within one or more of the heterogeneous database systems in generating an optimized query plan based upon the user query.

39. The article of manufacture of claim 28, wherein communicating with a plurality of communicating database systems comprises communicating with database systems having differing manners of supporting summary tables therein, and further comprising managing summary table usage on each of the communicating database systems, including accommodating the differing manners of supporting summary tables.

40. The article of manufacture of claim 28, wherein communicating with a remote database from a central location comprises communicating with a plurality of heterogeneous database systems from a central location, and wherein identifying a database table containing therein summary data from at least one of the plurality of heterogeneous database systems as being a summary table comprises recognizing as a summary table a database table within the remote database, the database table containing therein summary data corresponding to the remote database.

* * * * *

UNITED STATES PATENT AND TRADEMARK OFFICE
CERTIFICATE OF CORRECTION

PATENT NO. : 6,496,828 B1
DATED : December 17, 2002
INVENTOR(S) : Cochrane et al.

It is certified that error appears in the above-identified patent and that said Letters Patent is hereby corrected as shown below:

Column 4,
Lines 36 and 40, "FIGS. 1 through 12" should read -- FIGS. 1 through 6 --.

Column 5,
Line 22, "form a user or form" should read -- from a user or from --.
Line 33, "devices 28 the" should read -- devices 28, the --.

Column 6,
Line 50, "maybe" should read -- may be --.
Line 60, "systems 54 are" should read -- systems 54 that are --.

Column 9,
Line 24, "of or" should read -- of one or --.

Column 11,
Line 3, "may considered" should read -- may be considered --.
Line 35, "query 85into" should read -- query 85 into --.

Column 12,
Line 7, "queryplan" should read -- query plan --.
Line 11, "step 192" should read -- step 200 --.
Line 32, "be still be" should read -- still be --.
Line 43, "databases systems" should read -- database systems --.

Column 13,
Line 19, "step 184" should read -- step 202 --.
Line 21, "step 186" should read -- step 204 --.

Signed and Sealed this

Tenth Day of June, 2003

JAMES E. ROGAN
*Director of the United States Patent and Trademark Office*